Figure 1:
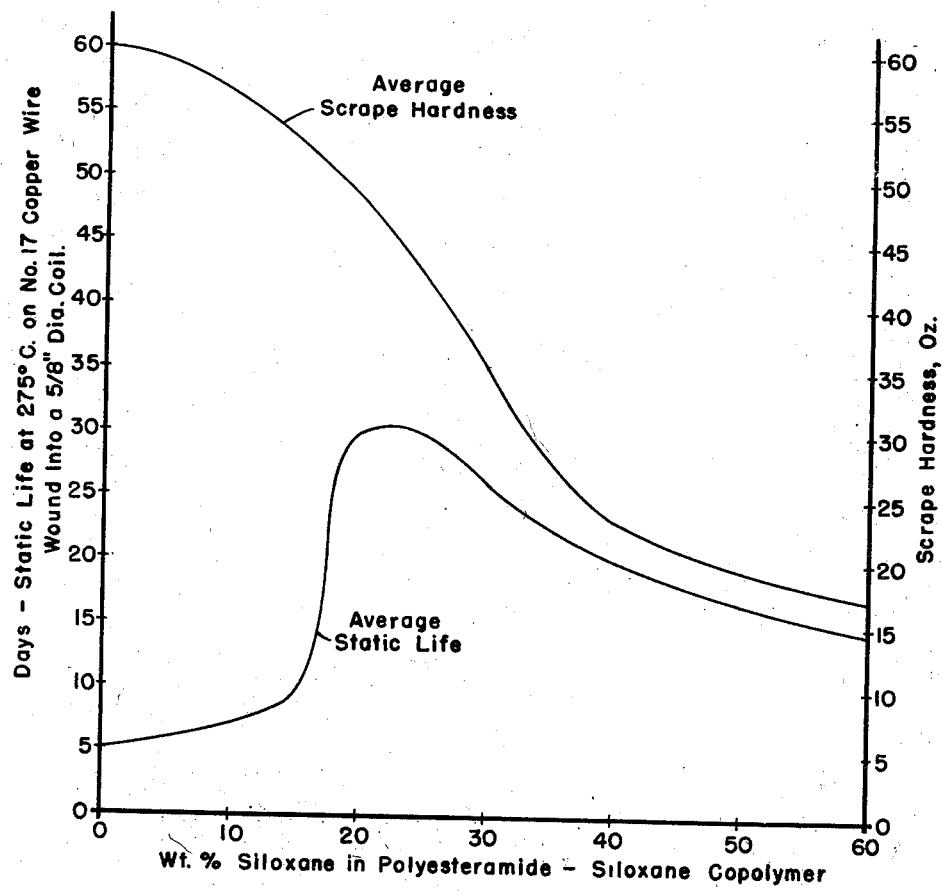

Jan. 28, 1958 F. A. SATTLER ET AL 2,821,517
POLYESTERAMIDE-SILOXANE RESIN AND INSULATED
PRODUCT PREPARED THEREFROM
Filed March 8, 1954

INVENTORS
Frank A. Sattler and
Stanley H. Langer.
BY
Frederick Shapoe
ATTORNEY

United States Patent Office 2,821,517
Patented Jan. 28, 1958

2,821,517

POLYESTERAMIDE-SILOXANE RESIN AND INSULATED PRODUCT PREPARED THEREFROM

Frank A. Sattler and Stanley H. Langer, Pittsburgh, Pa., assignors to Westinghouse Electric Corporation, East Pittsburgh, Pa., a corporation of Pennsylvania Application March 8, 1954, Serial No. 414,772

9 Claims. (Cl. 260—45.4)

This invention relates to resins prepared by co-reacting certain acidic polyesteramides and siloxanes, and electrical members, such, for example, an enameled wire prepared therewith.

It has been suggested in the prior art that alkyd resins be reacted with a siloxane in order to produce a joint resinous composition. We use the term "alkyd" resin to designate the polyester reaction product of only polyhydric alcohol and polycarboxylic acid. However, the resulting products do not possess any outstanding improvement in properties over and beyond the normally expected improvement in thermal life in line with the proportion of siloxane present. Thus, compositions comprising approximately 50% alkyd resin and 50% siloxane resin reacted together will exhibit only a moderate improvement in thermal stability as compared to the stability of the alkyd resin alone and substantially less than the thermal stability of the polysiloxane resin alone. In general, we have found that the improvement in thermal stability is relatively small for the high proportion of the much more expensive siloxane resin reacted with the alkyd resin. Other properties, such as hardness, adhesion to metal and other surfaces, are not appreciably improved in such known joint reaction products over the properties of either the alkyd resin or siloxane resin alone. Solvent resistance of the resulting joint reaction product resins is usually inferior to the solvent resistance of the alkyd resins.

We have discovered that the combination of certain polyesteramides with a relatively small proportion of certain selected siloxanes produces copolymer resins having improved properties far beyond those obtainable previously by combining siloxanes with alkyd resins. Our copolymer resins are particularly suitable for use in coating electrical conductors whereby to produce enameled wire which can be employed at high temperatures for prolonged periods of time.

An object of the present invention is to provide for co-reacting from 85 to 65 parts by weight of certain acidic polyesteramide resins and from 15 to 35 parts by weight of certain siloxanes in order to produce novel copolymers.

Another object of the present invention is to provide an electrical conductor with a cured coating comprising a specific polyesteramide-siloxane copolymer resin.

Other objects of the invention will, in part, be obvious and will, in part, appear hereinafter.

Figure 2:

For a better understanding of the nature and objects of the invention reference should be had to the following detailed description and drawing in which:

Figure 1 is a graph of curves plotting copolymer composition against static life and scrape hardness of wire coated with the compositions, and Fig. 2 is a fragmentary plan view, of a wire coated with the compositions of the invention.

We have discovered that conjoint reaction products derived (A) from 15 to 35 parts by weight of certain siloxane resins and (B) from 85 to 65 parts by weight of certain acidic polyesteramides possess an unexpected thermal stability, outstanding electrically insulating properties, a high scrape hardness, good flexibility, and a high degree of solvent resistance. In particular, the resinous copolymer reaction product comprises (A) a polymeric siloxane which is derived by hydrolyzing and condensing, with both water and a polyhydric alcohol, a mixture of hydrolyzable phenylmethyl silanes having the formula $$R_xSiY_{(4-x)}$$ 

where R represents both phenyl and methyl groups, Y represents a readily hydrolyzable group, and $x$ has an average value of from 1.3 to 1.9, and the ratio of phenyl to methyl groups being from 3:1 to 1:2. The water added for hydrolysis is present in an amount to hydrolyze at least 20%, but not over 90% of the hydrolyzable Y groups in the silanes, and the polyhydric alcohol is in an amount to provide an average of at least 0.6 hydroxyl group from each molecule thereof to react with each of the remaining hydrolyzable Y groups in the silanes, but with not over 80% of the total number of hydroxyl groups. Particularly good results have been obtained when from one to two hydroxyl groups of glycerol are utilized in reacting with the Y groups. The silanes may comprise the chlorides, ethoxides or other alkoxides or amino radicals as the hydrolyzable groups. Suitable silanes include dimethyldichlorosilane, phenylmethyldichlorosilane, phenyltriethoxysilane, phenylmethyldiethoxysilane, and methyltriethoxysilane. Suitable polyhydric alcohols are glycerol, ethylene glycol, diethylene glycol, propylene glycol and pentaerythritol. Mixtures of two or more of the polyhydric alcohols may be employed. The resulting siloxane is characterized by having both Si—O—Si linkages and Si—O—R' groups wherein R' represents the residue of the polyhydric alcohol with a proportion of the hydroxyl groups removed. The siloxane is solvent soluble and further reactable by reason of the available unreacted hydroxyl groups on the polyhydric alcohol residue. It will be appreciated that there may be some hydroxyl groups attached to silicon as a result of the hydrolysis of the hydrolyzable groups on the silanes by the water.

The polyesteramide (B) is prepared separately by heating (a) from 25 to 45 mole percent of an acidic compound selected from the group consisting of ethylenically unsaturated dicarboxylic acids and anhydrides thereof, (b) from 15 to 35 mole percent of an acidic compound having no ethylenic unsaturation selected from at least one of the group consisting of dicarboxylic acids and their anhydrides having at least two non-carboxyl carbon atoms and no other reactive groups than the carboxyl or carboxyl anhydride groups, the total of the two acidic compounds being at least 52 mole percent but not over 65 mole percent, (c) from 10 to 40 mole percent of polyhydric alcohols, the polyhydric alcohols having an average of not over 3.5 hydroxyl groups per molecule, (d) from 4 to 35 mole percent of at least one amine alcohol selected from the group consisting of monoethanolamine and monoisopropanolamine, and (e) from 4 to 15 mole percent of a diamino compound selected from the group consisting of ethylene diamine, propylene diamine and urea.

Examples of the (a) ethylenically unsaturated acids are maleic anhydride, fumaric acid, citraconic anhydride and itaconic acid. Examples of the (b) saturated acids are adipic acid, succinic acid, sebacic acid, diglycolic acid and succinic anhydride. Suitable polyhydric alcohols are glycerol, ethylene glycol, propylene glycol, diethylene glycol and pentaerythritol. Up to 15 mole percent of the ethylenically unsaturated dicarboxylic acid or anhydride thereof may be replaced by either phthalic anhydride or isophthalic acid.

In the polyesteramide, the combined polyhydric alcohol, amine alcohol and diamine provide a stoichiometric deficiency of amine and hydroxyl groups with respect to the carboxyl groups provided by the acidic compounds (a) and (b). It will be understood that an acid anhydride group is equivalent to two carboxyl groups. There should be present in the polyesteramide resin unreacted carboxyl groups equal, within plus or minus 20%, to the number of unreacted hydroxyl groups in the polyhydric alcohol component of the siloxane resin A.

The mixture of (a), (b), (c), (d) and (e) is heated to an elevated temperature of from 140° C. to 210° C. in about one hour. The heating should be continued until the polyesteramide resin has a ball and ring temperature of from 40° C. to 100° C. With large batches of the polyesteramide, the heating may require 10 hours or more to attain the desired ball and ring temperature.

The siloxane resin A and the polyesteramide resin B may be each prepared in solution in a suitable solvent such, for example, as cresol, and the solutions are then combined and the mixture is then further heated to a temperature of between 100° C. and 200° C. for at least 15 minutes. A test for establishing that a proper conjoint reaction product has resulted is to dissolve the resin in sufficient cresol to produce a 20% solution, and this solution will have a viscosity of from 30 to 60 seconds in a No. 1 Zahn cup at 30° C., though deviation may occur.

The conjoint reaction product may be dissolved in suitable solvents such, for example, as m, p-cresol, cresylic acid, ethyl phenols, furfural and petroleum hydrocarbon distillate boiling at 130° C. to 200° C., and mixtures of two or more.

The particularly important properties of enameled wire being employed for commercial high temperature applications are the scrape value, which is a measure of its toughness and hardness; and the time the enameled wire can be exposed to high temperatures before the enamel cracks or otherwise fails physically, which we designate "thermal endurance." We have found that the scrape testing machine described in U. S. Patent 2,372,093 to give highly reproducible and precise values for scrape tests of enameled wire and we have used it in all our tests of enameled wire. In making static thermal endurance tests, it has been found that a highly revealing test comprises wrapping a number of turns of wire of a size of No. 17, A. W. G., for instance, on a ⅝ inch diameter mandrel and then placing the resulting coil in an oven where the coil is heated to an elevated temperature, usually 275° C., and examined from time to time for signs of cracking, peeling or other failure, the time required to show any such failure being designated as its "static life." The stresses induced in the enamel by the coiling and the exposure to oxygen at the elevated temperature at which the test is conducted constitute important comparative indications of the life and stability of the enamel. Referring to Fig. 1 of the drawing there is shown average curves plotted from scrape and thermal endurance tests made of a number of siloxane-polyesteramide copolymers of the present invention with different weight proportions of siloxane. The scrape hardness curve drops slowly from a high average value of approximately 60 ounces for a polyesteramide having no siloxane to a value of about 53 ounces for a 15% siloxane copolymer and then somewhat more rapidly to values of 35 ounces for a 30% siloxane copolymer and then to 28 ounces for a 35% siloxane copolymer. The average thermal endurance in days at 275° C. starts at an average of 5 days for the polyesteramide alone, is about 8 days for a 15% siloxane copolymer, a peak thermal endurance of about 30 days is obtained from a 20 to 25% siloxane copolymer, and then a steady decrease in thermal endurance to about 23 days for a 35% siloxane copolymer. The optimum combination of both thermal endurance and scrape hardness is present for copolymer compositions having from 15% to 35% by weight of siloxane. It is surprising that both scrape endurance and days static life decrease from this optimum range for compositions having more than 35% siloxane.

It will be understood that the curves of Fig. 1 represent average values for a substantial number of compositions and that in tests of particular copolymer compositions values above and below the curves will be obtained. The thermal endurance values vary much more for a given composition than do the scrape hardness values.

The following examples are illustrative of the practice of the invention.

Example I

A. Into a reaction vessel provided with a stirrer heating means and sparging means, there were introduced the following:

| | M |
|---|---|
| Phenylmethyldichlorosilane | 59.5 |
| Phenyltrichlorosilane | 14.9 |
| Water | 54.5 |
| Glycerol (100%) | 54.4 |

The water usually present in the commercially available glycerol was determined and computed as a part of the total water added.

The chlorosilanes were dissolved in 2 kilograms of xylene and charged into the reaction vessel. The water was added dropwise while stirring vigorously, and the vessel sparged with nitrogen over a period of two hours. The glycerol was then added slowly and the reaction mixture was heated to 75° C. for one hour. Cresol in an amount of 3 liters was then added to the reaction vessel. The reaction vessel was then heated to 135° C. in one hour and then brought to a temperature of 160° C. over a period of 2½ hours, nitrogen sparging being continued throughout, at which time 18.8 liters of cresol was added. The siloxane resulting from the reaction had Si—O—Si linkages and an average of one hydroxyl group of the glycerol reacted with the chlorosilanes. The R to Si ratio of the resin is 1.8, while the ratio of phenyl to methyl is 1.25.

B. Into a reaction vessel, there were introduced the following:

| | M |
|---|---|
| Maleic anhydride | 171 |
| Adipic acid | 92 |
| Glycerol | 39.2 |
| Monoethanolamine | 128.5 |
| Ethylenediamine | 21.4 |

The reaction vessel was operated to bring the temperature of the mixture to 140° C. over a period of three hours and then gradually increased to 155° C. for an additional 3½ hours, sparging with nitrogen being effected during the entire reaction period. The ball and ring softening temperature of the resulting polyesteramide was 64° C.

The siloxane prepared in part A was then added to the polyesteramide B and the combined mixture was heated for ½ hour at a temperature of from 165 to 173° C. A mixture of equal parts of cresol and an aromatic petroleum hydrocarbon distillate was then added to produce a solution of approximately 26% resin solids. The enamel comprised approximately 20% by weight of siloxane.

The solution of the copolymer reaction product of this Example I was then applied to copper wire and baked at a temperature of from 475° C. to 500° C. for periods of time of from 30 seconds to a minute. A number of coatings were applied until a total of 1.0 mil thickness of enamel was deposited on No. 17 wire. As illustrated in Fig. 2, the enameled wire comprised a copper conductor 10 with the coating 12 comprising the cured copolymer resin.

The scrape hardness of the enameled wire ranged from 35 to 51 ounces as determined on the testing machine disclosed in U. S. Patent 2,372,093. The scrape hardness of a commercially available all siloxane resin on wire ranged from 9 to 14 ounces on the same test. Several turns of the enameled wire were wrapped on a ⅝ inch diameter mandrel and the resulting coil was placed in an oven where it was maintained at a temperature of 275° C. The wire of the mandrel was examined from day to day and no failure of the coating was observed until after 19 days cracks were first observed in the enamel coating. This coil test has been found to give values that correspond well with the life of electrical equipment carrying such enameled wire, at elevated temperatures. Ordinary organic enamels widely used in the trade at the present time will only withstand a day on the average. The best available polyesteramide enamel wire withstands about 4 days, under the same conditions, while an all siloxane enamel coating will withstand only 30 days on this test. After being immersed in toluene for 48 hours, the enameled wire of this example was tested and found to have suffered no appreciable change in scrape hardness. The all-siloxane resin enameled wire had a scrape hardness of less than 4 ounces after immersion in toluene and was so deteriorated that it was considered to be substantially worthless. The enameled wire of this example exhibits a dielectric strength of from 4,000 to 6,000 volts, whereas the all-siloxane enameled wire had a dielectric strength of from 1,000 to 1,500 volts. In numerous other tests, which are employed widely for determining the characteristics of enameled wire, the resultant wire of this example showed outstanding characteristics.

Aluminum wire was coated with the copolymer resin of this Example I and it showed higher thermal stability than on copper wire and the physical properties were equal to the same enamel on copper.

Example II

A. There was reacted in accordance with the procedure set forth in Example I, the following:

| | | |
|---|---|---|
| Phenylmethyldichlorosilane | M__ | 0.595 |
| Phenyltrichlorosilane | M__ | 0.149 |
| Water | M__ | 0.272 |
| Glycerol | M__ | 0.545 |
| Xylene | g__ | 20.0 |
| Cresol | g__ | 57.0 |

R to Si is 1.8 for this siloxane, while the ratio of phenyl to methyl is 1.25.

B. The following were introduced into a reaction vessel:

| | M |
|---|---|
| Maleic anhydride | 1.805 |
| Adipic acid | 0.817 |
| Glycerol | 0.574 |
| Monoethanolamine | 1.285 |
| Ethylenediamine | 0.214 |

The ingredients of part B were reacted as in Example I with the temperature being raised 5° C. per hour after the first hour up to a temperature of 160° C. Then 188 ml. of cresol was added. The siloxane of part A of this example was added and reacted over a period of 7 hours at a temperature of 180° C. The resulting resin had about 21% of siloxane. The resulting conjoint resin was applied to No. 17 copper wire to a coating thickness of 1 mil. A ⅝ inch diameter coil of this enamel wire did not show any crazing until after 22 days at 275° C. The physical properties of the enamel were excellent under all of the tests applied to enameled wire to determine its properties:

Example III

A. The following were reacted in accordance with the procedure of part A of Example I:

| | | |
|---|---|---|
| Dimethyldichlorosilane | M__ | 0.298 |
| Phenylmethyldichlorosilane | M__ | 0.297 |
| Phenyltrichlorosilane | M__ | 0.149 |
| Water | M__ | 0.545 |
| Glycerol | M__ | 0.54 |
| Xylene | g__ | 20 |
| Cresol | g__ | 30 |

The ratio of R to Si is 1.8 for this siloxane, and the ratio of phenyl to methyl is 0.75.

The resulting siloxane was admixed with the polyesteramide produced in accordance with Part B of Example I and then reacted in accordance with the procedure set forth in Example I to produce a conjoint resin. The product contained 16% siloxane resin.

The coating of the conjoint resin of this Example III was applied to No. 17 copper wire to a thickness of 1 mil. Coils produced by wrapping the enameled wire on a ⅝ inch diameter mandrel did not crack or craze until after about 30 days in an oven at 275° C. The enameled wire passed all of the tests applied to establish that it was of high quality.

Example IV

A. The following were reacted:

| | | |
|---|---|---|
| Phenylmethyldiethoxysilane | M__ | 0.488 |
| Methyltriethoxysilane | M__ | 0.107 |
| Phenyltriethoxysilane | M__ | 0.149 |
| Water | M__ | 0.545 |
| Glycerol | M__ | 0.544 |
| Xylene | g__ | 20 |
| Cresol | g__ | 30 |

The ratio of R to Si is 1.65, and ratio of phenyl to methyl is 1.07.

The ethoxysilanes dissolved in the xylene were initially placed in a reaction vessel and the water added dropwise over a period of 30 minutes. The mixture was then heated to 80° C. and maintained at this temperature for 1½ hours. The glycerol was then added slowly over a period of 30 minutes and then the cresol was added. The temperature was increased to 135° C. and the distillation proceeded smoothly. The reaction mixture was then heated to 160° C. at the rate of 10° C. per hour. After ½ hour at 160° C., 188 ml. of cresol was added.

A polyesteramide prepared in accordance with part B of Example I was admixed with the siloxane resin of part A of this Example IV. The mixture was then heated at ½ hour at 170° C. The siloxane content was 18%. Enameled wire was coated with this mixture and found to possess a high scrape resistance, a high resistance to solvents and a thermal life of over 18 days as established by heating wire coils at 275° C.

Example V

A. The following were reacted:

| | | |
|---|---|---|
| Phenylmethyldichlorosilane | M__ | 0.595 |
| Phenyltrichlorosilane | M__ | 0.149 |
| Water | M__ | 0.545 |
| Ethylene glycol | M__ | 0.408 |
| Pentaerythritol | M__ | 0.204 |
| Xylene | g__ | 20.0 |
| Cresol | ml__ | 30 |

The ratio of R to Si is 1.8 while the ratio of phenyl to methyl is 1.25.

The chlorosilanes dissolved in the xylene were charged into a reaction vessel and the water added dropwise over a period of 1½ hours with nitrogen sparging. The temperature was 34° C. The ethylene glycol and pentaerythritol were admixed and added dropwise over a period of ½ hour. The mixture was then heated to 55° C. and the cresol was added. The reaction mixture was then heated to 65° C. and maintained at that temperature for 1 hour. Following this, the temperature was raised rapidly to 135° C. and then increased at the rate of 10° C. per hour until it had reached 160° C., at which temperature the entire vessel was kept for ½ hour. 188 milliliters of cresol was then added.

The following were introduced into a reaction vessel:

| | M |
|---|---|
| Maleic anydride | 1.705 |
| Adipic acid | 0.92 |
| Ethylene glycol | 0.294 |
| Pentaerythritol | 0.147 |
| Monoethanolamine | 1.285 |
| Ethylenediamine | 0.214 |

The reaction vessel was heated rapidly to a temperature of 160° C. over a period of 1 hour and then maintained at that temperature until it reached a ball and ring softening temperature of 68° C.

There was then added to the polyesteramide B the siloxane of part A of this example and the mixture was further reacted for ½ hour at 165° C. The siloxane formed about 19% of the resins. The resulting composition was employed as an enamel for treating copper wire and had a high thermal endurance of over 20 days and a high scrape hardness.

*Example VI*

B. In a reaction vessel the following were reacted:

| | M |
|---|---|
| Phthalic anhydride | 0.358 |
| Maleic anhydride | 1.45 |
| Adipic acid | 0.817 |
| Glycerol | 0.392 |
| Monoethanolamine | 1.285 |
| Ethylenediamine | 0.214 |

The phthalic anhydride and glycerol were introduced first and heated at 176 to 200° C. for 1.5 hours. The remaining ingredients were then added and reacted at 160° C. to a ball and ring softening temperature of 73° C. Then 1% of the weight of the siloxane A of Example I was added and the joint mixture heated for 0.5 hour at 170° C. The mixture comprised 20% by weight of siloxane.

A solution containing 28% solids was prepared by adding cresol plus aromatic solvents. No. 17 copper wire was coated with the composition and cured at 475° C. to provide a 1.0 mil thick enamel coating. The scrape hardness of the enamel was found to be 40 to 47 ounces, remaining unchanged after 48 hours' immersion in toluene. The dielectric strength was 4500 to 6000 volts. A coil of the enameled wire wrapped on a ⅝ inch mandrel withstood 20 days at 275° C. before cracks were observed.

*Example VII*

A. A siloxane was prepared by dissolving 25.3 lbs. of phenylmethyldichlorosilane and 7 lbs. of phenyltrichlorosilane in a mixture comprising 12.75 lbs. of m,p-cresol and 4.45 lbs. of xylene, and adding this slowly over an hour to a reaction vessel containing 5.59 lbs. of glycerol (100%) and 2.18 lbs. of water. The vessel was sparged continually with nitrogen and the reacting mixture stirred vigorously. The temperature rose spontaneously to 70° C. and was maintained at this value. The temperature was raised rapidly at the end of the hour to 120° C., and then increased at the rate of 10° C. per hour to 160° C. and then held for 0.5 hour at 160° C. The siloxane is then diluted with 41.8 lbs. of cresol. The R to Si ratio is 1.8.

B. In a reaction vessel the following were reacted, in accordance with the procedure of Example IB:

| | Lbs. |
|---|---|
| Maleic anhydride | 39.4 |
| Adipic acid | 26.6 |
| Glycerol | 13.6 |
| Monoethanolamine | 17.5 |
| Ethylenediamine | 2.9 |

The resin was reacted to a ball and ring temperature of 70° C., and the siloxane of part A of this example was added. After 15 minutes at 165° C., the resulting copolymer resin was cooled and diluted with a mixture of 122 lbs. of cresol and 135 lbs. of an aromatic petroleum distillate. The copolymer resins comprised 20% siloxane.

The resin copolymer solution of this Example VII was applied to copper wire. It had a dielectric strength of from 4000 to 6000 for a 1 mil thick coating on No. 17 wire. Its scrape resistance was 32 to 39 ounces. A ⅝ inch diameter coil withstood 19 days in an oven at 275° C. before it showed visible cracks.

The conjoint resinous compositions of the present invention may be modified by adding thereto up to 30 parts by weight of an epoxy resin for every 100 parts by weight of the polyesteramide-siloxane copolymer resin solids. The epoxy resins may comprise the reaction product of a polyhydric phenol such as bis-4-hydroxyphenyl dimethyl methane, with from 1 to 2 moles of a halohydrin. Suitable halohydrins are epichlorohydrin, glycerol-dichlorohydrin and epibromohydrin. The preparation of suitable resinous epoxides is set forth in U. S. Patents 2,575,558, 2,506,486 and 2,324,483.

The compositions of this invention may be applied not only to bare copper, aluminum, iron and nickel plated wire, for example, but to conductors that are covered with glass fibers or asbestos fibers. The conductors may have been taped with suitable fibrous sheet materials. Furthermore, the conductors may have been covered with tapes comprising mica flakes prior to the application of the resinous compositions of this invention.

It will be appreciated that the resinous compositions of this invention may be employed as insulating varnishes and impregnating compounds. However, the particularly outstanding characteristic compositions of this invention are exhibited when they are employed as wire enamels.

It will be understood that the above examples are exemplary and not limiting.

We claim as our invention:

1. A resinous composition comprising the reaction product derived by admixing and heating (A) from 15 to 35 parts by weight of a polymeric siloxane derived by hydrolyzing and condensing with both water and a saturated aliphatic polyhydric alcohol having an average of from 2 to 4 hydroxyl groups per molecule, a hydrolyzable hydrocarbon silicon compound having the formula $$R_xSiY_{(4-x)}$$

where R represents at least one radical selected from the group consisting of phenyl and methyl groups, Y represents a readily hydrolyzable group, and $x$ has an average value of from 1.3 to 1.9, the ratio of phenyl to methyl groups being from 3:1 to 1:2, the water added for hydrolysis being in an amount to hydrolyze at least 20%, but not over 90% of the hydrolyzable Y groups in the silanes, and the polyhydric alcohol being in an amount to provide an average of at least 0.6 hydroxyl group but not exceeding 80% of the total hydroxyl groups in each molecule thereof for each of the remaining hydrolyzable Y groups in the silanes, the resulting polymeric siloxane being characterized by both Si—O—Si linkages and —Si—O—R' groups wherein R' represents the residue of the polyhydric alcohol with one hydroxyl group removed, and (B) from 85 to 65 parts by weight of a polyesteramide reaction product derived by heating (a) from 25 to 45 mole percent of an acidic compound selected from the group consisting of ethylenically unsaturated dicarboxylic acids, (b) from 15 to 35 mole percent of an acidic compound having no aliphatic carbon to carbon unsaturation selected from at least one of the group consisting of dicarboxylic acids and their anhydrides having at least two non-carboxyl carbon atoms and no other reactive groups than the carboxyl and carboxyl anhydride groups, the total of the two acidic compounds being at least 52 mole percent, (c) from 10 to 40 mole percent of a saturated hydrocarbon polyhydric alcohol, the polyhydric alcohol being an average of not over 3.5 hydroxyl groups per molecule, (d) from 4 to 35 mole percent of at least one amine alcohol selected from the group consisting of monoethanolamine and monoisopropanolamine, and (e) from 4 to 15 mole percent of a diamino compound selected from the group consisting of ethylene diamine, propylene diamine and urea, the mixture of (a), (b), (c), (d) and (e) being reacted to a polyesteramide resin having ball and ring temperature of from 40° C. to 100° C., the combined polyhydric alcohol, amine alcohol and diamine providing a stoichiometric deficiency of amine and hydroxyl groups over the amount reactable with the carboxyl groups provided by the acidic compounds in the polyesteramide resin, whereby there are unreacted carboxyl groups in the polyesteramide substantially equal to the number of unreacted hydroxyl groups in the polymeric siloxane, the reaction of the (A) polymeric siloxane and the (B) polyesteramide being carried out at temperatures between 100° C. and 200° C. until a 20% solution in cresol has a viscosity of from 30 to 60 seconds in a No. 1 Zahn cup at 30° C., and (C) an organic solvent dissolving the reaction product.

2. A resinous composition comprising the reaction product derived by admixing and heating (A) from 15 to 30 parts by weight of a polymeric siloxane derived by hydrolyzing from 0.45 to 0.6 mole of phenylmethyldichlorosilane and from 0.1 to 0.28 mole of phenyltrichlorosilane with from 0.5 to 0.6 mole of water and from 0.25 to 0.6 mole of glycerol, the hydrolysis product being heated between 100° C. and 180° C. to condense it to a polymeric siloxane having both Si—O—Si and —Si—O—R' groups wherein the R' represents glycerol with one hydroxyl group removed, and (B) from 85 to 65 parts by weight of a polyesteramide resin derived by heating (a) from 1.7 to 1.9 moles of at least one unsaturated acidic compound selected from the group consisting of maleic anhydride, maleic acid and fumaric acid, (b) from 0.7 to 0.9 mole of adipic acid, (c) from 0.6 to 0.75 mole of glycerol, (d) from 1.2 to 1.4 moles of monoethanolamine, and (e) from 0.15 to 0.25 mole of ethylenediamine, the total moles of acidic compound and the adipic acid being sufficient to provide an excess of carboxyl groups over the amount reacted with all the hydroxyl and amine groups in the glycerol, monoethanolamine and ethylene diamine in producing the polyesteramide resin, such excess of unreacted carboxyl groups being substantially equal to the number of free hydroxyl groups in the R' radicals in the polymeric siloxane, the polyesteramide being heated above 120° C. to a ball and ring temperature of from 40° C. to 80° C., the polymeric siloxane being then admixed with the polyesteramide and further heated for a period of time to produce a joint resinous reaction product, and (C) an organic solvent dissolving the joint reaction product.

3. The composition of claim 2, wherein up to 0.5 mole of an acid from the group consisting of phthalic anhydride and isophthalic acid replaces an equal number of moles of the unsaturated acidic compound employed in preparing the polyesteramide.

4. The composition of claim 2, wherein up to 0.15 mole of methyltrichlorosilane replaces an equal number of moles of the phenyltrichlorosilane.

5. The composition of claim 2, wherein phenylmethyldiethoxysilane and phenyltriethoxysilane replace the phenylmethyldichlorosilane and the phenyltrichlorosilane respectively.

6. The composition of claim 2, wherein the composition includes up to 30% of the weight of the joint reaction product of a polyepoxy resin derived by reacting one mole of a polyhydric phenol with from 1 to 2 moles of a halohydrin.

7. An insulated conductor comprising, in combination, an electrical conductor and cured solid resinous insulation applied thereto, the resinous insulation applied to the conductor consisting of the reaction product derived by admixing and heating (A) from 15 to 30 parts by weight of a polymeric siloxane derived by hydrolyzing from 0.45 to 0.6 mole of phenylmethyldichlorosilane and from 0.1 to 0.28 mole of phenyltrichlorosilane with from 0.5 to 0.6 mole of water and from 0.25 to 0.6 mole of glycerol, the hydrolysis product being heated between 100° C. and 180° C. to condense it to a polymeric siloxane having both Si—O—Si and —Si—O—R' groups wherein the R' represents glycerol with one hydroxyl group removed, and (B) from 85 to 65 parts by weight of a polyesteramide resin derived by heating (a) from 1.7 to 1.9 moles of at least one unsaturated acidic compound selected from the group consisting of maleic anhydride, maleic acid and fumaric acid, (b) from 0.7 to 0.9 mole of adipic acid, (c) from 0.6 to 0.75 mole of glycerol, (d) from 1.2 to 1.4 moles of monoethanolamine, and (e) from 0.15 to 0.25 mole of ethylenediamine, the total moles of acidic compound and the adipic acid being sufficient to provide an excess of carboxyl groups over the amount reacted with all the hydroxyl and amine groups in the glycerol, monoethanolamine and ethylene diamine in producing the polyesteramide resin, such excess of unreacted carboxyl groups being substantially equal to the number of free hydroxyl groups in the R' radicals in the polymeric siloxane, the polyesteramide being heated above 120° C. to a ball and ring temperature of from 40° C. to 80° C., the polymeric siloxane being then admixed with the polyesteramide and further heated for a period of time to produce a joint resinous reaction product, and (C) an organic solvent dissolving the joint resinous reaction product.

8. An insulated conductor as set forth in claim 7 wherein up to 0.5 mole of an acid from the group consisting of phthalic anhydride and isophthalic acid replaces an equal number of moles of the unsaturated acidic compound employed in preparing the polyesteramide.

9. An insulated conductor as set forth in claim 7 wherein the resinous insulation applied to the conductor includes up to 30% of the weight of the joint reaction product of a polyepoxy resin derived by reacting one mole of a polyhydric phenol with from 1 to 2 moles of a halohydrin.

References Cited in the file of this patent

FOREIGN PATENTS 2,516,030    Switzerland ---------- July 18, 1950